(12) United States Patent
Biehler

(10) Patent No.: US 8,891,554 B2
(45) Date of Patent: Nov. 18, 2014

(54) METHOD FOR DATA TRANSMISSION IN AN AUTOMATION SYSTEM USING DYNAMIC FRAME PACKING

(75) Inventor: Georg Biehler, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 438 days.

(21) Appl. No.: 13/325,535

(22) Filed: Dec. 14, 2011

(65) Prior Publication Data

US 2012/0155493 A1 Jun. 21, 2012

(30) Foreign Application Priority Data

Dec. 15, 2010 (EP) .................................... 10195057

(51) Int. Cl.
*H04L 12/28* (2006.01)
*H04L 12/56* (2006.01)
*H04L 12/43* (2006.01)
*H04J 3/00* (2006.01)
*H04J 3/24* (2006.01)
*H04L 12/403* (2006.01)

(52) U.S. Cl.
CPC .................................. *H04L 12/4035* (2013.01)
USPC ............ 370/474; 370/392; 370/458; 370/476

(58) Field of Classification Search
USPC ......................................................... 370/474
See application file for complete search history.

(56) References Cited

U.S. PATENT DOCUMENTS

| 8,015,324 B2 | 9/2011 | Klotz et al. |
| 2001/0024451 A1* | 9/2001 | Le Strat et al. ................ 370/468 |
| 2002/0006128 A1* | 1/2002 | Yehuda et al. ................ 370/390 |
| 2002/0150100 A1* | 10/2002 | White et al. .................. 370/392 |
| 2003/0137975 A1* | 7/2003 | Song et al. ..................... 370/353 |
| 2004/0213291 A1* | 10/2004 | Beshai et al. ................. 370/473 |

(Continued)

FOREIGN PATENT DOCUMENTS

| DE | 10 2007 004 044 | 7/2008 |
| EP | 2 028 797 | 2/2009 |
| EP | 2 109 259 | 10/2009 |

OTHER PUBLICATIONS

Robert Wilmes, Phoenix Contact Electronics: "Dynamic Frame Packing (DFP) verleiht Profinet Flügel", Weka Fachmedien GmbH, eletroniknet.de, (Apr. 29, 2009), XP002635338, Gefunden im Internet: URL://www.elektroniknet.de/automation/technik-know-how/feldebene/article/1374/0/Dynamic_Frame_Packing_DFP_verleiht_Profinet_Fluegel/?type=99 [gefunden am May 3, 2011], das ganze Dokument.

*Primary Examiner* — Jenee Williams
(74) *Attorney, Agent, or Firm* — Cozen O'Connor

(57) ABSTRACT

A method for data transmission in an automation system from a second field device via a first field device to a receiver, wherein, at the first field device, a first data subframe is created, a second data frame is received from the second field device, and a first data frame including the first and the second data subframe is sent correctly-timed by Dynamic Frame Packing to the receiver. In the event the second data subframe is unable to be appended directly to the first data subframe at the latest after the correctly-timed sending of the first data subframe, the sending of the first data frame is shifted by a time value, where the time value is calculated so that immediately after the sending of the first data subframe, the second data subframe is able to be appended directly to the first data subframe.

11 Claims, 6 Drawing Sheets

(56) References Cited

U.S. PATENT DOCUMENTS

| | | | |
|---|---|---|---|
| 2005/0025185 A1* | 2/2005 | Brown et al. | 370/474 |
| 2005/0036507 A1* | 2/2005 | Hall et al. | 370/463 |
| 2006/0029102 A1* | 2/2006 | Abe et al. | 370/474 |
| 2009/0003383 A1* | 1/2009 | Watanabe et al. | 370/474 |
| 2009/0110003 A1* | 4/2009 | Julien et al. | 370/476 |
| 2009/0303958 A1* | 12/2009 | Vesma et al. | 370/330 |
| 2010/0074262 A1 | 3/2010 | Breit et al. | |
| 2010/0211711 A1 | 8/2010 | Kuschke et al. | |

* cited by examiner

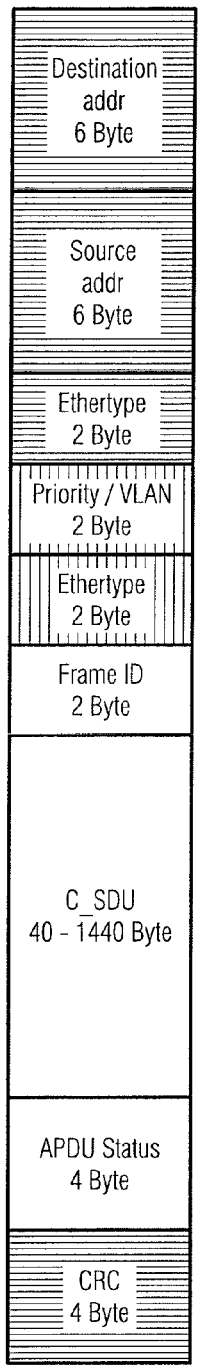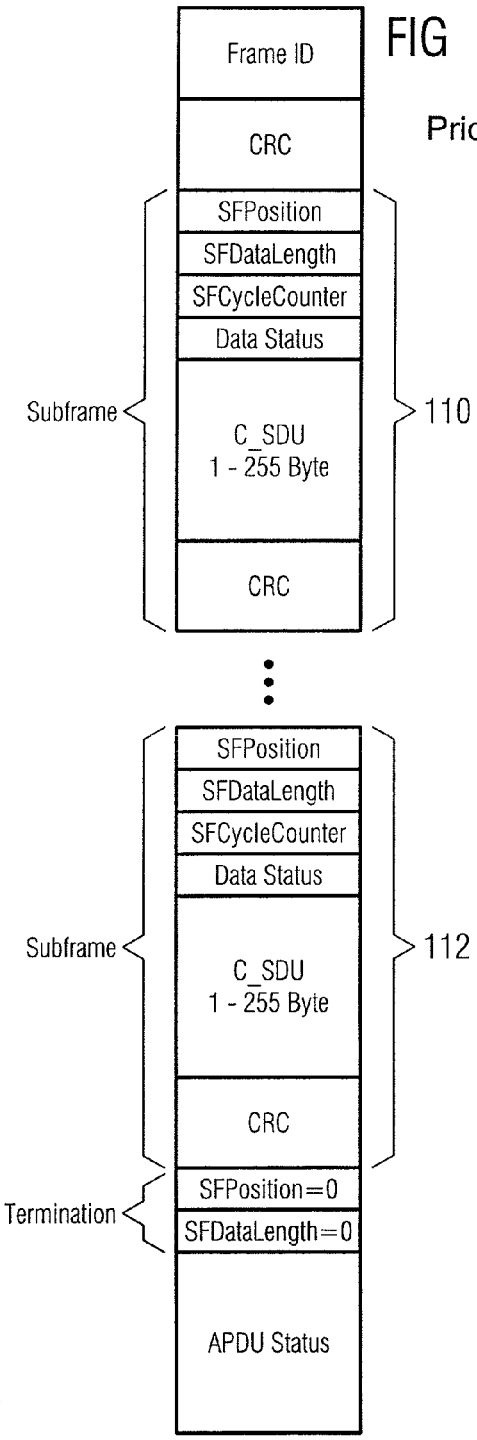

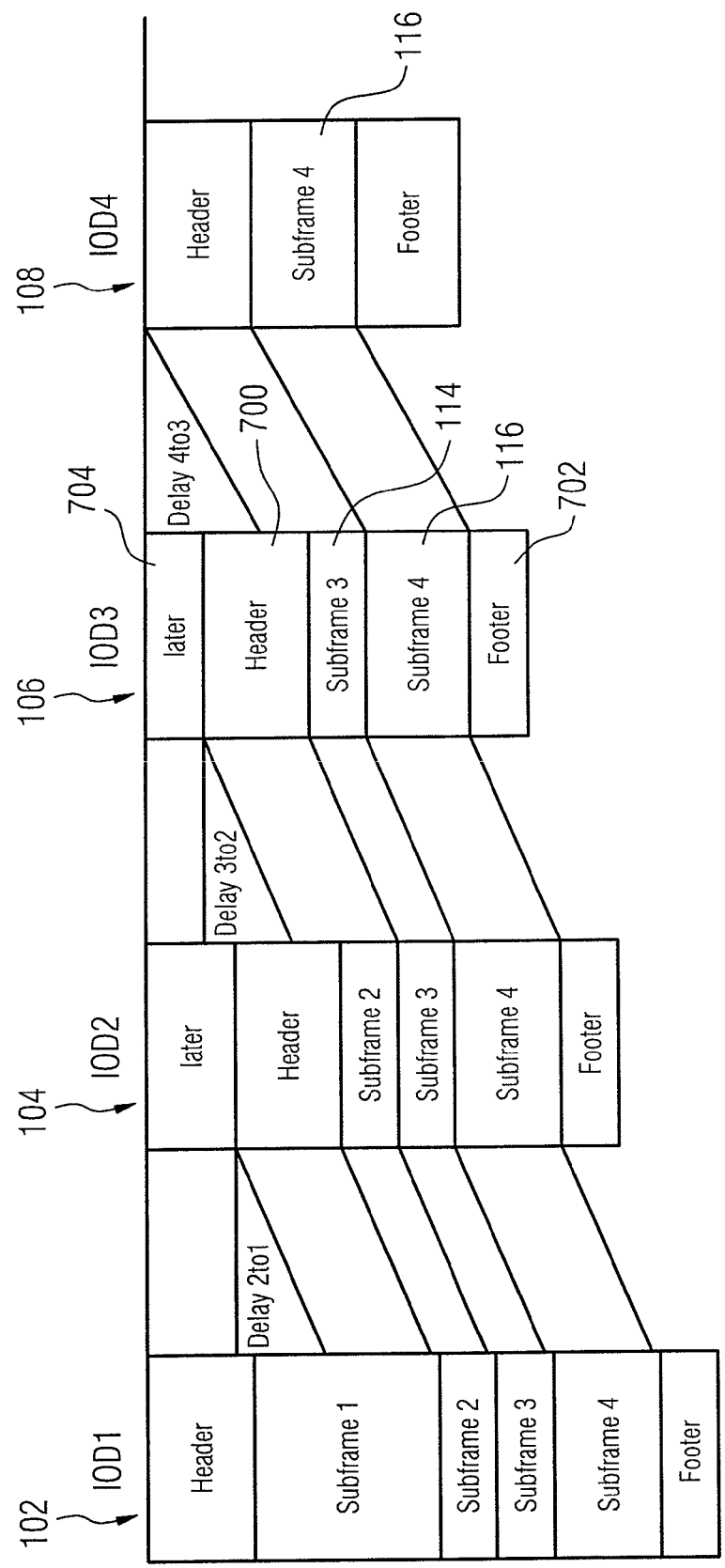

METHOD FOR DATA TRANSMISSION IN AN AUTOMATION SYSTEM USING DYNAMIC FRAME PACKING

BACKGROUND OF THE INVENTION

1. Field of the Invention

The invention relates to data communications and, more particularly, to a method for automated data transmission in automation system, a computer program product and to a field device for data transmission in an automation system using Dynamic Frame Packing.

2. Description of the Related Art

The known concept of Dynamic Frame Packing (DFP) was introduced to increase the transmission speed of data from field devices to controllers in an automation system. In DFP, data is transmitted using container frames. Terminals that are assigned to a packing group then transmit the data within these container frames. The advantage of transmitting data in this manner is that the overhead of Ethernet frames used for a given transmission is only counted once, since, because of the container frame, for example, only a preamble, a start frame delimiter and a header are used. As a result, it is possible to increase the packing density so that, within one clock cycle, data can be transmitted by a plurality of field devices, with the updating rates in relation to the transmission being significantly increased in comparison to data transmission that would not use DFP.

FIG. 1 shows the structure of a conventional real-time frame, with this frame itself being encapsulated for Ethernet transmissions in accordance with Request for Comment (RFC) 894 using the elements destination address, source address, Ethertype and cyclic redundancy check (CRC). In the event of priority tagging being used in accordance with Institute of Electrical and Electronic Engineers (IEEE) standard 802.1Q with the Ethertype set to 0x8100, followed by a priority/VLAN field, followed by a second Ethertype, which is set to 0x8892 and which indicates a real-time frame.

The frame ID is used to identify the frame itself, whereby the C_SDU is intended to transport the IO data of the field devices and the APDU status specifies the status of the frame.

In these cases, the C_SDU can be structured so that it either carries the IO data of an individual field device or so that it carries the IO data of a number of field devices. In the latter case, where the C_SDU carries a number of field devices, a part of the C_SDU (i.e., the subframe) carries the content of a specific field device. Here, the frame is subdivided into a number of subframes.

The reason for using a subdivision into frames is to minimize the required bandwidth and to explicitly optimize the overall system performance. As shown in FIG. 1, the overhead of a frame, i.e., the bytes to be transported other than the C_SDU, amounts to 28 bytes. However, the InterFrameGap additionally amounts to 12 bytes. As a result, the preamble amounts to 7 bytes and the start frame delimiter amounts to 1 byte and these also have to be taken into account, i.e., the sum total of the overhead of a frame amounts to 48 bytes (or 42 bytes if the preamble is shortened to 1 byte). If the C_SDU is also smaller than 40 bytes the difference must also be added in.

It is thus evident that the use of subdivided frames reduces the required bandwidth by combination of subframes 110 and 112, since, as shown in FIG. 2, the overhead of a subframe merely amounts to 6 bytes. By combining a number of subframes into an individual frame, the overhead for the frame that is used is only counted once.

Assigned to each of the subframes 110 and 112 is a position, a control bit, a data length that describes the length of the C_SDU, a cycle counter, a data status and a CRC. Here, the position involves a unique identifier for a given subframe, whereby the list of subframes is terminated by a specific subframe with the position number 0.

The control bit serves to specify whether or not the CRC and cycle counter of the subframe are to be ignored.

The data status of a subframe specifies the data status of the subframe. The data status within the APDU status of the frame specifies the data status of the frame. In the event of the frame consisting of subframes, the data status of the frame can be ignored. It is also helpful to assign a static value to the data status of the frame.

SUMMARY OF THE INVENTION

It is an object of the invention is to provide a method for data transmission in an automation system, a computer program product and a field device for data transformation in an automation system.

This and other objects and advantages are achieved in accordance with the invention by a method for data transmission in an automation system from a second field device via a first field device to a receiver, wherein at the first field device, a first data subframe is created, where the first data subframe comprises process data of the first field device; a second data frame is received from the second field device, where the second data frame comprises a second data subframe with process data of the second field device; and a first data frame comprising the first and the second data subframe is sent correctly-timed by Dynamic Frame Packing (DFP) to the receiver.

In this case, in the event that a second data subframe that is sent can not be appended immediately to the first data subframe at the latest after the correctly-timed sending of the first data subframe, the sending of the first data frame is shifted by a time value, where the time value is calculated so that immediately after the first data subframe is sent the second data subframe is able to be appended directly to the first data subframe.

In accordance with the invention, the above described receiver can, for example, comprises a controller of the automation system, i.e., an IO controller (IOC). Alternatively, the receiver can also comprise a further field device that is connected downstream from the first field device.

The disclosed embodiments of the invention have the advantage that, because of the calculation of an optimum transmission time of the first data frame with the seamless concatenation of the first and second data subframes, real-time data transmission in the automation system is guaranteed.

Expressed in simple terms, the beginning of the transmission time of the first data frame is delayed until such time as the second data subframe, i.e., as soon as this is available at the first field device for Dynamic Frame Packing, can be seamlessly added to the first data subframe contained in the first data frame. Thus, as soon as the second data subframe is available for Dynamic Frame Packing at the first field device, the second data subframe is added by adding it to the first data subframe already in the process of being sent at this moment. The second data subframe is thus directly appended to the first data subframe by the correctly-timed sending, with correctly-timed meaning that the second data subframe can be appended to the first data subframe at the correct time, i.e., there is no gap in the form of a wait time that has to be filled by a "gap frame" after sending out the first data subframe.

Here, the second data subframe does not yet have to be completely received, i.e., the frame can be appended dynamically to the first outgoing data subframe even during the receiving (input) of the second data subframe.

In accordance with an embodiment of the invention, the transmission time of the second data frame from the second to the first field device is included in the calculation of the time value. For example, the transmission time includes a time delay for sending the second data frame by the second field device, a time delay for receiving the second data frame by the first field device and/or a time delay through the cable delay time of the second data frame between the first and the second field devices.

This enables the extent to which the sending of the first data frame must be shifted in time to take into account the hardware circumstances of the first and second field device to be established precisely. In addition, the spatial distance between the first and second field devices is taken into account by taking into account the cable delay time, i.e., in the event of the first and second field devices being far away from each other, a corresponding signal between the first and second field devices would need a longer period of time, starting from the second field device, in order to arrive at the first field device. All this is taken into account in an optimum manner by in accordance with the disclosed embodiments of the method of the invention.

In accordance with a further embodiment of the invention, the calculation of the time value includes the lead time for performing the Dynamic Frame Packing at the first field device. This means that here too the hardware in the form of the first field device is taken into account in the computation of the time value. The second data subframe can thus be appended to the first data subframe in an optimum manner.

In accordance with a further embodiment of the invention, the time offset of the local time systems in the first and second field device, i.e., the "Peer-to-Peer-Jitter", is taken into account in the calculation of the time value.

In accordance with a further embodiment of the invention, the first data frame is sent via a further field device to the receiver, with data transmission of all field devices occurring in a time-synchronized manner, where for all field devices a global and/or an individual local send start offset is predetermined as time delay, where a beginning of the data transmission in a field device is delayed in relation to the beginning of the data transmission in a neighboring field device at least by the send start offset, and where the sending of the first data frame by the first field device occurs at the earliest after the send start offset has elapsed. In other words, either in a global manner or individually a suitable value of a time delay can be specified for each field device, in accordance with which the respective field device begins its send process in relation to a neighboring field device.

In accordance with a further embodiment of the invention, in the event of the sum of transmission duration of the second data frame from the second to the first field device, the time offset of the local time system in the first and second field device and/or the lead time for performing the Dynamic Frame Packing in the first field device being greater than the duration for sending the entire first data subframe, the time value becomes negative. In such cases, the duration for sending the entire first data subframe is governed by its size. Thus, the larger the first data subframe, the more time will be needed to transfer individual bits of the data subframe sequentially to the receiver.

In accordance with a further embodiment of the invention, the time value is calculated from the sum of transmission duration of the second data from the second to the first field device, time offset to local time system in the first and second field device, the lead time for performing the Dynamic Frame Packing in the first field device and the time value by which the sending of the second data frame at the second field device was delayed for the purposes of correctly-timed sending, minus the duration for sending the entire first data subframe. Here, the time parameters of this sum can be included in their entirety in the calculation of the time value. However, it is also possible for only particular individual parameters to be included in the calculation of the time value. The inclusion of only particular individual parameters in the calculation of the time value can be especially useful if the size of the individual parameters are particularly negligible.

In accordance with a further embodiment of the invention, in the event of the calculated time value being smaller than the send start offset of the first field device, the send start offset of the first field device is used as the time value.

Another object of the invention is to provide a computer program product with instructions able to be executed by a processor (Application Specification Integrated Circuit (ASIC)) for performing the method steps as mentioned above.

Another object of the invention is to provide a first field device, where the first field device is configured to receive data from a second field device and is configured to send data to a receiver. The first field device is further configured to create a first data subframe, where the first data subframe comprises process data of the first field device; receive a second data frame from the second field device, where the second data frame includes a second data subframe with process data of the second field device; send correctly-timed to the receiver a first data frame comprising the first and the second data subframe by Dynamic Frame Packing (DFP), In the event that a second data subframe that is sent can not be appended immediately to the first data subframe at the latest after the correctly-timed sending of the first data subframe, the sending of the first data frame is shifted by a time value, where the time value is calculated so that immediately after the first data subframe is sent the second data subframe is able to be appended directly to the first data subframe.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred embodiments of the invention are explained in greater detail below with reference to the drawings, in which:

FIG. 1 shows the structure of a conventional real-time frame;

FIG. 2 shows the structure of a sub-divided conventional real-time frame;

FIG. 7 shows a schematic diagram of the execution of dynamic frame packing (DFP) using correctly-timed sending in accordance with the invention.

DETAILED DESCRIPTION OF THE PRESENTLY PREFERRED EMBODIMENTS

Figure 3:
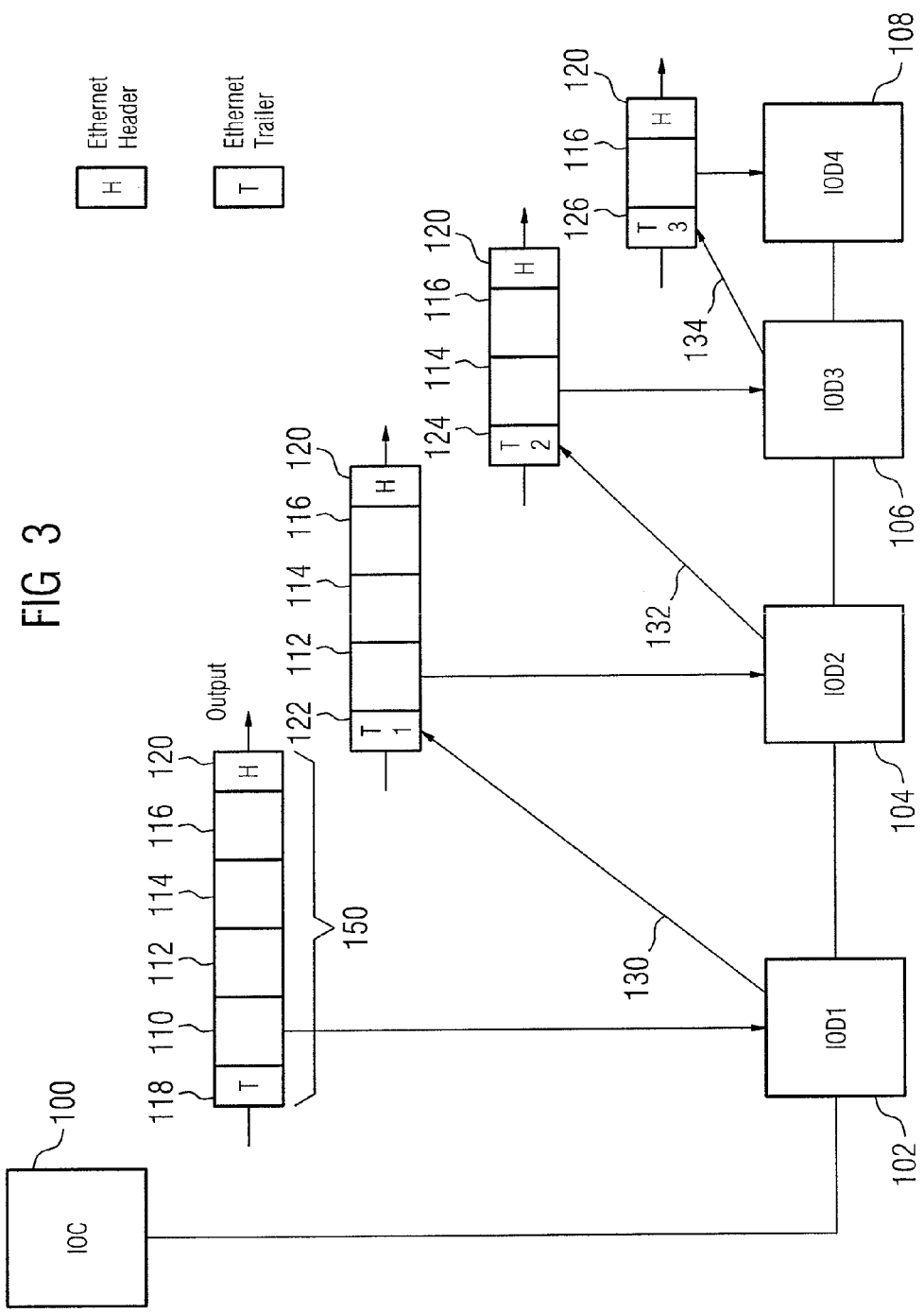
FIG. 3 shows the sequence of a method for data transmission using dynamic frame packing (DFP) in accordance with the invention.

Elements similar to one another are identified below by the same reference characters.

FIG. 3 shows a method for data transmission using DFP in accordance with the invention. Here, it is assumed in the following explanation that, in an automation system, as well as a controller (IOC) 100, four field devices (10 devices) 102, 104, 106 and 108 are arranged topologically behind one another. Data transmission using Dynamic Frame Packing occurs in this method, starting from IOC 100, to the field devices 102, 104, 106 and 108 so that the IOC 100 transfers a packet to the field device 102, with this packet comprising a number of subframes 110, 112, 114 and 116, which each contain user data for the field devices 102, 104, 106 or 108. The container 150 used for data transmission, in addition to the subframes 110, 112, 114, 116 also has an Ethernet Header 120 and an Ethernet Trailer 118.

After receipt of the container 150 by the field device 102, the field device 102 extracts the data subframe 110 intended for it from the container 150 and then sends, in the step labeled with the reference character 130, a new packet to the field device 104. This new packet, however, now no longer contains the data subframe 110 but only the data subframes 112, 114 and 116, which are intended for the topologically downstream field devices 104, 106, 108. The Ethernet Header 120 is transferred unchanged while a new Ethernet Trailer 122 is created and is appended to the data packet.

After receipt of the data packet created in this way by the field device 104, the field device 104 extracts the data subframe 112 intended for it and creates in step 132 in its turn a new packet, where this new packet now only comprises the data subframes 114 and 116, as well as the Ethernet Header 120. The packet created in this way also comprises a new Ethernet Trailer 124.

The packet created in this way is then in its turn received by field device 106, which removes the data subframe 114 and in step 134 transfers the remaining data subframe 116 together with the Ethernet Header 120 and a new Ethernet Trailer 126 to the last field device 108.

It can thus be stated in summary that each IO device (each field device 102, 104, 106 and 108) in a consecutive sequence, starting from controller 100, is supplied with frames, where after each receipt of the packet, the respective field device forwards the packet in modified form to the downstream field device.

Figure 4:
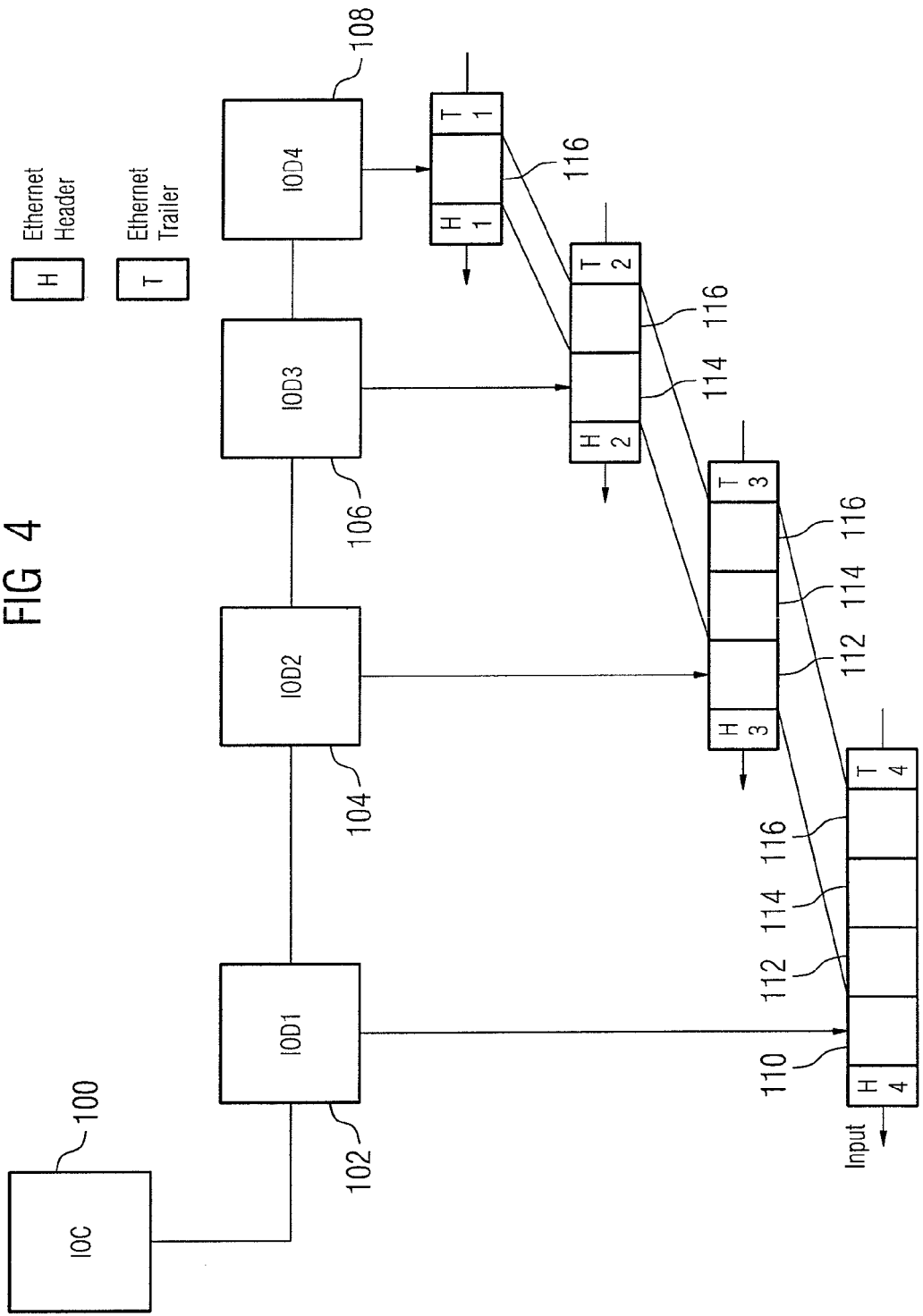
FIG. 4 shows the sequence of a method for data transmission using dynamic frame packing (DFP) in accordance with an embodiment of the invention.

FIG. 4 shows the sequence of a method for data transmission using DFP in accordance with an alternative embodiment of invention, Here, however, by contrast to the diagram in FIG. 3, a data transmission is initiated by the field device 108. The field device 108 sends a frame with Ethernet Header and Ethernet Trailer as well as a data subframe 116 embedded therebetween to the field device 106, which then appends its data subframe 114 to the data subframe 116. The data packet created in this way is transferred to the field device 104, which in its turn adds its data subframe 112 to the packet and transfers the frame created in this way to the field device 102. The field device 102 appends its data subframe 110 to the data subframe 112 of the field device 104 and forwards the frame created in this way to the controller 100.

Figure 5:
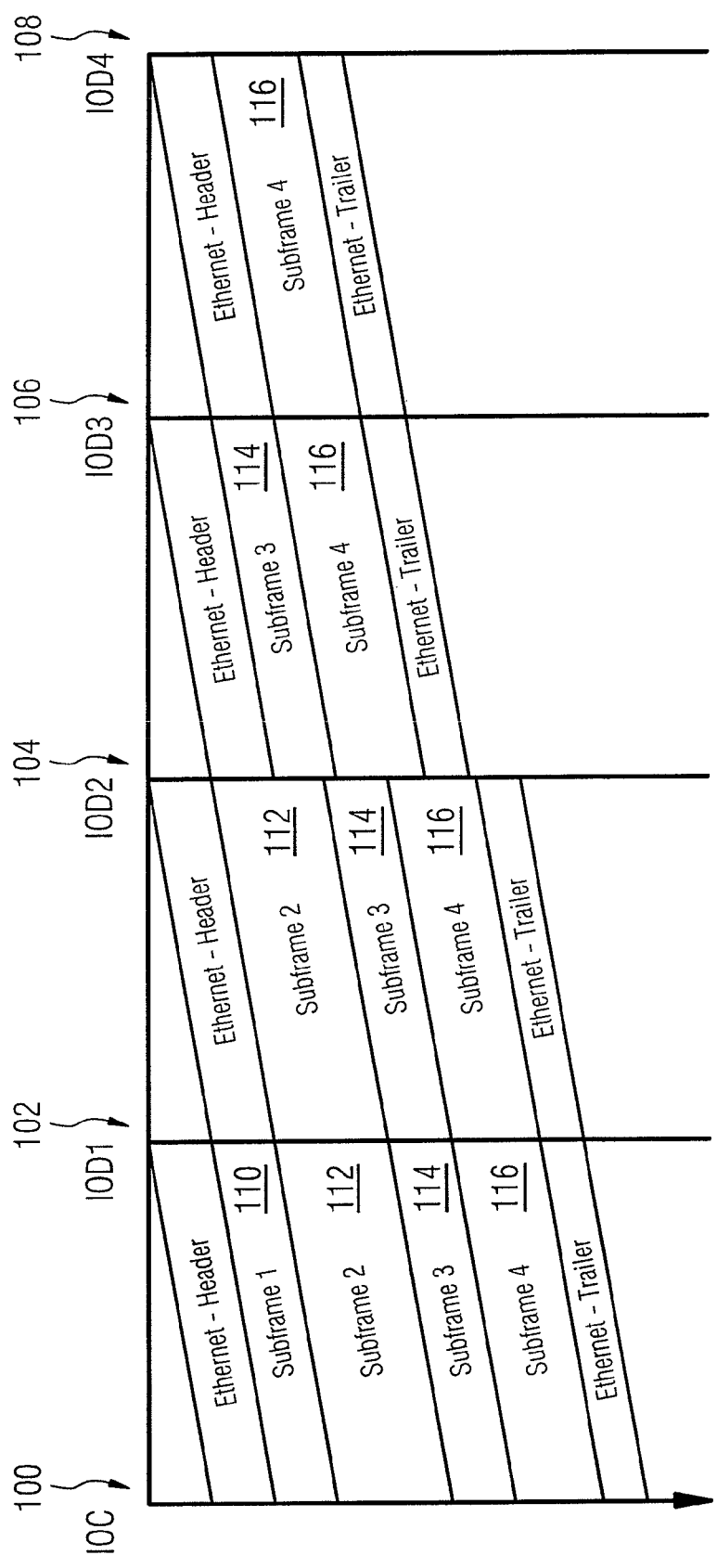
FIG. 5 shows a schematic block diagram of the functioning of dynamic frame packing (DFP) in accordance with the invention.

FIG. 5 shows schematically how Dynamic Frame Packing is performed as regards timing. In this figure, the abscissa represents the distance covered by data packets, while the time needed for transmission is plotted on the ordinate.

In this case, the schematic representation of Dynamic Frame Packing (DFP) in FIG. 5 corresponds to the representation of DFP data transmission in FIG. 4. Here, FIG. 5 shows ideal conditions for Dynamic Frame Packing, i.e., the data subframes, starting from the right-hand field device through to the controller, arrive at the subsequent field devices with such correct timing that the data subframe received in this way can be added readily and without any gap to the data subframe of this respective field device. Thus, for example, in FIG. 5 the data subframe 116 reaches the field device 106 before this has completely sent the data subframe 114.

In the event of the field device 106 sending out the data subframe 114 with a time delay, from this delay value (FSO, FrameSendOffset) a local period of time can be defined from which it can be concluded when the sending of the data subframe 114 is completed. Here, this time is produced by the size of the data subframe 114, i.e., from the ratio between the first byte after the checksum of the data subframe and the first byte of the actual frame used for sending, i.e., the first byte of the destination address, multiplied by a value defined by the system, such as 80 ns. This produces the last point in time at which the data subframe 116 must be available at the field device 106 for the purposes of DFP. Otherwise, a "DFP frame late error", i.e. an error, would be produced.

It should be noted that in the present case the Ethernet Header can simply be ignored because this is transferred both by the field device 108 and also by the field device 106. An FSO is also basically related to the start frame delimiter. Consequently, it is irrelevant whether a short or a long preamble is used at a specific receive port of the field device 106 (Tx port).

For this reason the following inequality applies:

$$FSO_{IODn} + \text{MaxLineRxDelay} + \text{MaxDFP\_Feed} \leq FSO_{IODn-1} + \text{SubframeSize}_{IODn-1} - \text{PeerToPeerJitter}$$

The left-hand side of this inequality describes that the data subframe n is transmitted by the field device n (IODn) at point in time $FSO_{IODn}$, where the data subframe n must pass through the signal line between field device n and n−1 (IODn and IODn−1). For this reason, a MaxLineRxDelay, i.e., the period of the transmission time of the data frame between the field devices must be added. In this case, this transmission time, in addition to a time delay caused by the cable delay time of data frames between the field devices, can also include a time delay (Tx Delay) on transmission of the data frame by a field device 102, 104, 106, 108 and/or a time delay (Rx Delay) on receipt of the data frame by a field device.

MaxDFP_Feed describes the lead time for performing the Dynamic Frame Packing at the receiving field device 102, 104, 106, 108. MaxDFP_Feed describes the lead time that the field device 102, 104, 106, 108 needs to still be able to append the data of an incoming data subframe to the currently transmitted data frame.

The right-hand side of the above-mentioned inequality describes that the data subframe n−1 is sent at point in time $FSO_{IODn-1}$, where the duration $\text{SubframeSize}_{IODn-1}$ is inserted as a period, i.e., the period that is needed for sending the subframe n−1. The FSO is either defined for IODn−1 or IOD in the respective local time systems, which is synchronized with a SyncMaster. As a result, a PeertoPeer Jitter, i.e., a timing offset to local time systems in the field devices is taken into account. It is preferable for a packet with data subframes not to be allowed to arrive too late at the neighboring field device 102, 104, 106, 108 to enable it to be appended in good time. Consequently, this PeertoPeer Jitter is subtracted from $FSO_{IODn-1}$.

The above-mentioned inequality can now be transformed into:

$$MaxDFP\_Feed+MaxLineRxDelay+PeerToPeerJitter-SubframeSize_{IODn-1} \leq FSO_{IODn-z}-FSO_{IODn}$$

MaxDFP_Feed, PeertoPeer Jitter, TxDelay and RxDelay (both components of MaxLineRxDelay) are device properties which are predetermined by the manufacturer of the field device 102, 104, 106, 108. Only the cable length, i.e., the signal delay time caused by said length, which is part of MaxLineRxDelay, can be configured by the user.

In order to now satisfy this inequality, the following conventional process is implemented.

Within a DFP packing group essentially all field devices 102, 104, 106, 108 begin the send process of their data subframes at the same point in time. In other words, the FSO amounts to an identical value for all field devices 102, 104, 106, 108, so that $FSO_{n-1}-FSO_n$ amount to zero. This results in:

$$MaxDFP\_Feed+MaxLineRxDelay+PeerToPeerJitter-SubframeSize_{IODn-1} \leq 0$$

And from the foregoing, the following relationship is obtained:

$$SubframeSize \geq \frac{MaxDFP\_Feed + \begin{pmatrix} TxPortDelay + CableDelay + \\ RxPortDelay \end{pmatrix} + PeerToPeerJitter}{80\ ns}$$

The meaning of this is as follows: In the event of the actual real data subframe size at a field device 102, 104, 106, 108 lying below this order of magnitude calculated in this formula, the corresponding size of the data subframe must be artificially increased. This is shown by way of example in FIG. 6.

Figure 6:
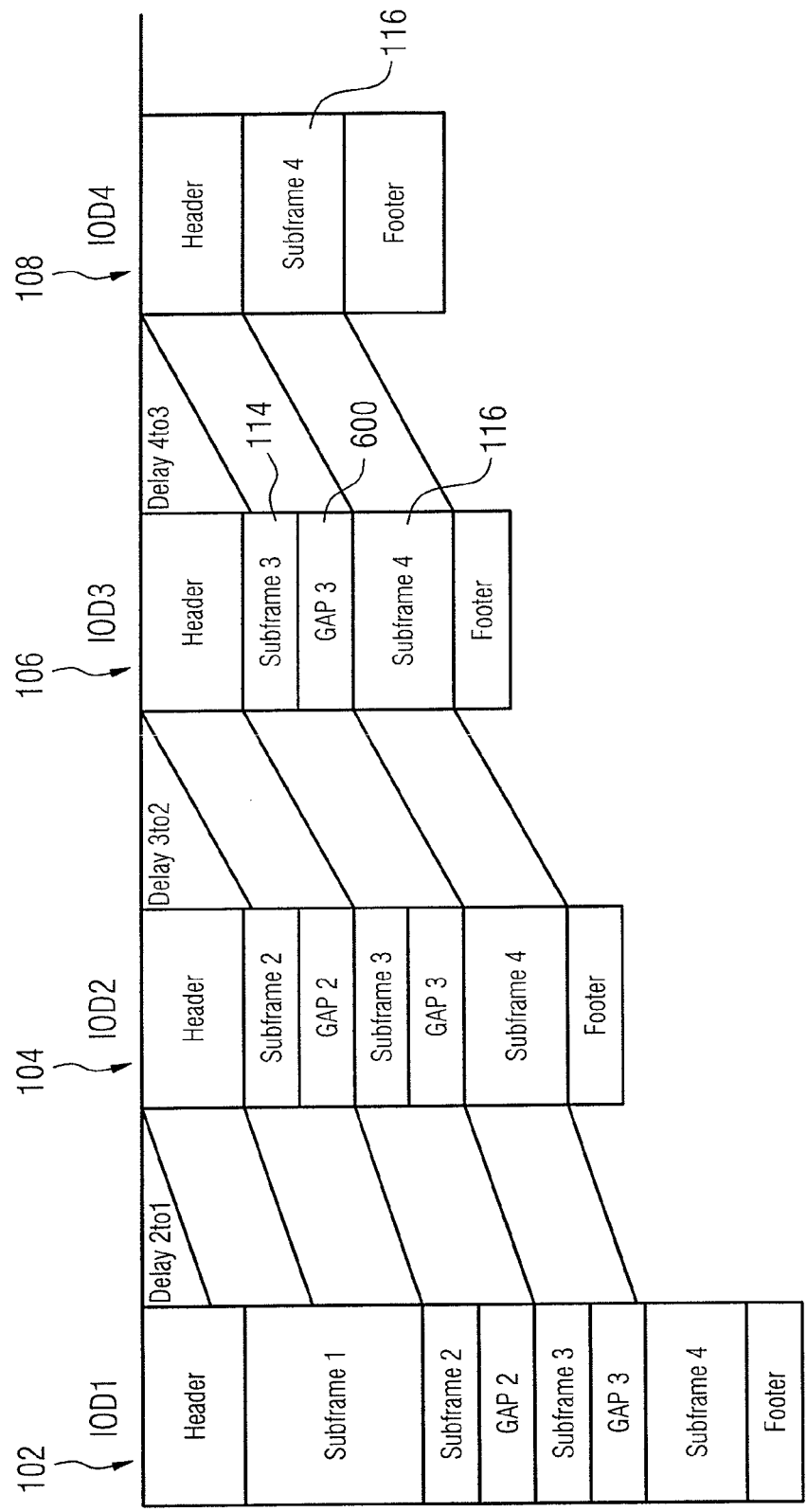
FIG. 6 shows a schematic diagram of dynamic frame packing (DFP) with adaptation of the size of data subframes in accordance with the invention.

In FIG. 6 all field devices 102, 104, 106, 108 are connected one after the other and have the same FSO value, i.e., the same point in time at which a data transmission to a neighboring field device is begun. In any event, the problem arising in FIG. 6 is that the data subframe 116 begins to be received by the field device 106 significantly later than the field device 106 has finished sending its data subframe 114. In other words, the field device 106 finishes sending out the data subframe 114 in the direction of the field device 104 before even starting to receive the data subframe 116 from field device 108. In order, despite this, not to have to forward the data subframe 116 in a separate frame to the field device 104, the field device 106 then introduces, in accordance with the above described "SubframeSize" equation, a gap filler 600, which thus follows immediately after the data subframe 114 as data subframe 600. As soon as the data subframe 116 is received at the field device 106, this will be dynamically appended to the data subframe 600 being sent out at that moment, so that overall the frame shown in FIG. 6, consisting of header, data subframe 114, gap 600, data subframe 116 and footer is produced.

However, the consequence of this is that in a clearly visible manner the size of the frame sent in this way increases. This increases the amount of data to be transmitted and is therefore not so performant.

For this reason, the present invention proposes the method outlined in reference to FIG. 7, which makes real-time data transmission possible but, however, does not increase the data transmission overhead needed. In particular, instead of inserting a gap 600 after the data subframe 114, the alternative embodiment of the invention provides a delay of the send time of the frame at the field device 106 by a period 704 long enough for the data subframe 116 to be added seamlessly to the data subframe 114. This produces the frame outlined in FIG. 7 in relation to the field device 106, which consists of header 700, data subframe 114, data subframe 116 and footer 702.

In other words, the send start time FSO of the field device $IOD_{n-1}$ (exemplary field device 106) is defined so that the data subframe 114 sent out by this field device 106 ends precisely when the data subframe of the field device $IOD_n$ (i.e., field device 108) is ready at the field device 106 for performing DFP. The data subframe 116 is thus added directly to the data subframe 114 without any gap. In an embodiment of the invention, it is possible for a global and/or an individual local send start offset to be predetermined as a time delay. Such a send start offset indicates that a start of data transmission in a field device 102, 104, 106, 108 is delayed in relation to the start of the data transmission in a neighboring field device 102, 104, 106, 108 at least by this send start offset, in order to have the transmission always occurring in the network in a time section reserved for real-time communication. If, for example, a send start offset valid for all field devices (Global Start Offset) is provided, a respective send time at the field devices 102, 104, 106, 108 should not occur before this send start offset period has elapsed. This can be expressed by the following formula:

$$FSO_{IODn-1}=MAX(FSO_{IODn}+MaxDFP\_Feed+MaxLineRxDelay+PeerToPeerJitter-SubframeSize_{IODn-1};\ GlobalStartOffset)$$

In the specific case that the size of the data subframe of $IOD_{n-1}$ is greater than the sum of MaxDFP_Feed, MaxLineRXDelay and PeertoPeer Jitter, the FSO of IODn−1 should be the same or brought forward in relation to the FSO at $IOD_n$. In other words, in this special case, in which the sum of transmission duration, time offset of the local time systems and the lead time to perform the Dynamic Frame Packing is greater than the time for sending the respective data subframe, the time offset 704 used is negative.

In summary, this produces the option of calculating an optimum send time for data subframes to be sent. No gap frames are additionally appended to data subframes, so that the overall size of the sent frames can be kept as small as possible.

A chain of ET 200 ecoPN 8DI, of a block periphery in IP67 with PROFINET connection, which each need 8 bytes of subframe size, should be mentioned here as a practical example.

If the known times for ERTEC200+ for MaxDFP_Feed and MaxLineRxDelay are used and if a cable length of 100 m is assumed, a minimum subframe size of 15 bytes is needed to implement the process discussed in FIG. 6, if PeerToPeerJitter of 100 ns can be achieved. If the PeerToPeerJitter is greater (e.g., 300 ns), only a minimum subframe size of 18 bytes is achievable.

Thus, in an implementation of the process discussed in FIG. 6, an 8 byte gap is needed per subframe of an ecoPN in a packing group. This gap "GAP" can no longer be compensated for further forwards on the line. Consequently, the IO controller for each ecoPN principally needs between 6*80 ns=560 ns and 10*80=800 ns (depending on the achievable PeerToPeerJitter) more receive time for the DFP frame than would actually be necessary without the gap.

In an implementation of the process discussed in FIG. 6, although the upstream neighbor of a device with subframe size below 15-18 bytes is "scheduled" later by this time, this time is, however, compensated for by further devices downstream which have a subframe size greater than 15-18 Bytes (e.g., drives or modular devices, such as ET200S or ET200M), so that the frame at the IO controller is smaller overall.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for data transmission in an automation system from a second field device via a first field device to a receiver, comprising:
   creating, at the first field device, a first data subframe comprising process data of the first field device;
   receiving, at the first field device, a second data frame from the second field device, the second data frame including a second data subframe with process data of the second field device; and
   correctly-timed sending, from the first field device to the receiver, a first data frame comprising the first data subframe and the second data subframe by Dynamic Frame Packing;
   wherein, in an event of the second data subframe being unable to be appended directly to the first data subframe no later than after the correctly-timed sending of the first data subframe, the sending of the first data frame is shifted by a time value; and
   wherein the time value is calculated so that immediately after the sending of the first data subframe the second data subframe is appendable directly to the first data subframe.

2. The method as claimed in claim 1, wherein a transmission time of the second data frame from the second field device to the first field device is included in a calculation of the time value.

3. The method as claimed in claim 2, wherein the transmission time comprises at least one of a time delay for sending the second data frame by the second field device, a time delay for receipt of the second data frame by the first field device and a time delay corresponding to a cable delay time of the second data frame between the second and first field devices.

4. The method as claimed in claim 1, wherein a lead time for performing the Dynamic Frame Packing at the first field device is included in a transmission time.

5. The method as claimed in claim 1, wherein a time offset of local time systems in the first field device and the second field device are included in the calculation of the time value.

6. The method as claimed in claim 1, wherein the first data frame is sent via a further field device to the receiver;
   wherein the data transmission of each of the first field device, the second field device and the further field device occurs in a time-synchronized manner;
   wherein for each of the first field device, the second field device and the further field device at least one of a global and an individual local send start offset (GlobalStartOffset) is a predetermined time delay;
   wherein a beginning of the data transmission at the first field device and the further field device is delayed in relation to a beginning of the data transmission at the second field device and the first field device, respectively, at least by the individual local send start offset; and
   wherein the sending of the first data frame by the first field device occurs at the earliest after the individual local send start offset has elapsed.

7. The method as claimed in claim 1, wherein, in an event of a sum of at least one of a transmission duration of the second data frame from the second field device to the first field device, a time offset of local time systems in the first field device and the second field device and a lead time for performing the Dynamic Frame Packing at the first field device is greater than a time for sending an entire first data subframe, the time value becomes negative.

8. The method as claimed in claim 1, wherein the time value is calculated from a sum of at least one of a transmission duration of the second data frame from the second field device to the first field device, a time offset of local time systems in the first field device and the second field device, a lead time for performing the Dynamic Frame Packing at the first field device and a time value by which the sending of the second data frame at the second field device was delayed for the correctly-timed sending, minus a time for sending an entire first data subframe.

9. The method as claimed in claim 8, wherein, in an event of the calculated time value being smaller than the individual local send start offset of the first field device, the individual local send start offset of the first field device is used as the time value.

10. A non-transitory computer program product encoded with a computer program executed by a processor that causes data transmission in an automation system from a second field device via a first field device to a receiver, the computer program comprising:
    program code instructions for creating, at the first field device, a first data subframe comprising process data of the first field device;
    program code instructions for receiving, at the first field device, a second data frame from the second field device, the second data frame including a second data subframe with process data of the second field device; and
    program code instructions for correctly-timed sending, from the first field device to the receiver, a first data frame comprising the first data subframe and the second data subframe by Dynamic Frame Packing;
    wherein, in an event of the second data subframe being unable to be appended directly to the first data subframe no later than after the correctly-timed sending of the first data subframe, the sending of the first data frame is shifted by a time value; and wherein the time value is calculated so that immediately after the sending of the first data subframe the second data subframe is appendable directly to the first data subframe.

11. A first field device configured to comprising:

a processor and memory, the first field device receiving data from a second field device and sending the data to a receiver;

wherein the first field device is configured to:

create a first data subframe including process data of the first field device;

receive a second data frame from the second field device, the second data frame including a second data subframe with process data of the second field device;

send to the receiver correctly-timed by Dynamic Frame Packing a first data frame including the first data subframe and the second data subframe;

wherein, in an event of the second data subframe being unable to be appended directly to the first data subframe no later than after the correctly-timed sending of the first data subframe, the sending of the first data frame is shifted by a time value; and wherein the time value is calculated so that immediately after the sending of the first data subframe the second data subframe is appendable directly to the first data subframe.

* * * * *